Dec. 2, 1952     H. W. KROHN, JR     2,619,727
TIRE TREAD GAUGE
Filed March 21, 1950
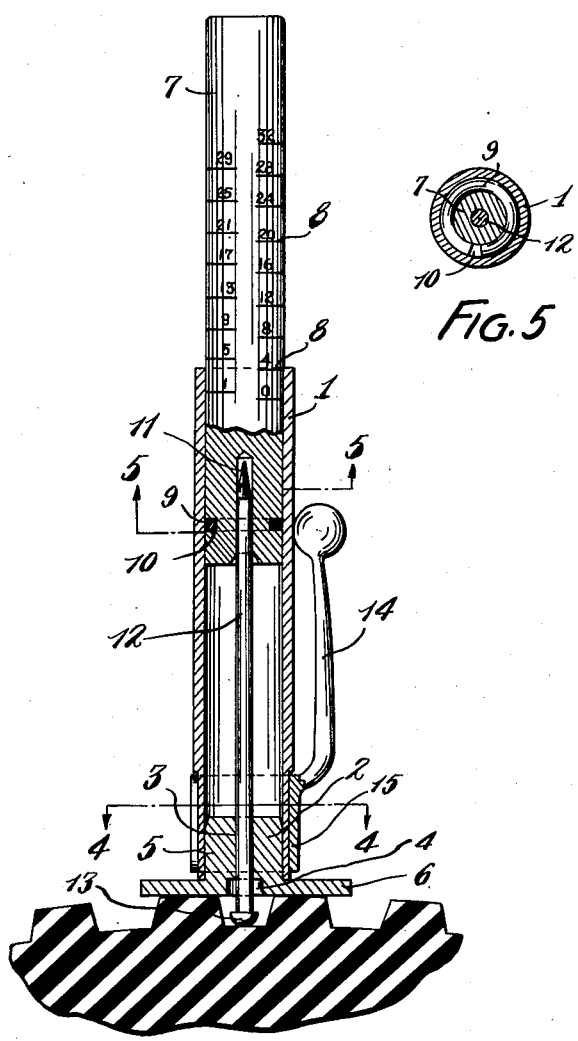
FIG. 1
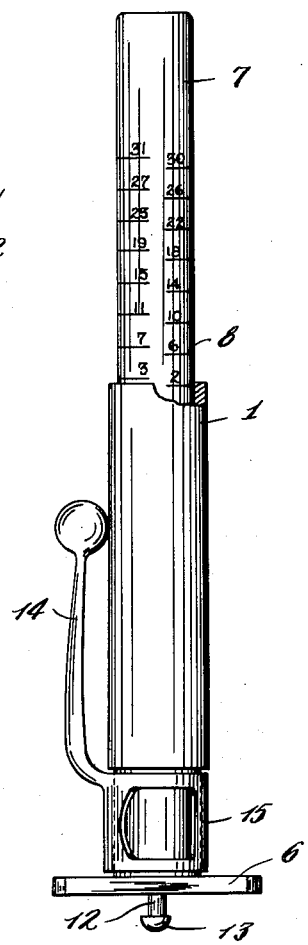
FIG. 5
FIG. 2
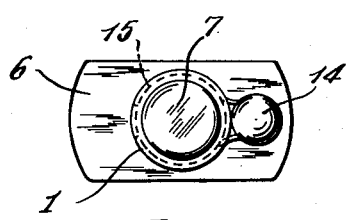
FIG. 3
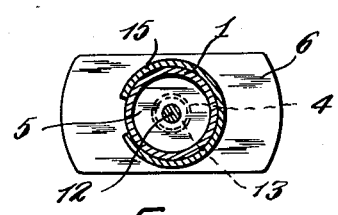
FIG. 4
INVENTOR.
HENRY W. KROHN JR.
BY Hudson, Boughton,
Williams, David & Hoffmann
ATTORNEYS Patented Dec. 2, 1952

2,619,727

UNITED STATES PATENT OFFICE 2,619,727

TIRE TREAD GAUGE

Henry W. Krohn, Jr., Cleveland, Ohio, assignor to The Dill Manufacturing Company, Cleveland, Ohio, a corporation of Ohio Application March 21, 1950, Serial No. 150,957

2 Claims. (Cl. 33—172)

The present invention relates to a gauge which may be applied to the tread of a pneumatic tire casing and which when properly applied will give a measurement which will be indicative of the amount of tread wear that has been occasioned by the use of the tire.

The purpose of the present invention is to provide a device of the character described which is simple in construction and which may be of such size as to be conveniently carried in the pocket of the person using the gauge, in the same manner as a pen or pencil is carried.

Referring to the drawings,

Fig. 1 indicates an elevation with parts in section of the gauge;

Fig. 2 is an elevation with a small portion in section of the gauge;

Fig. 3 is a top plan view of the gauge;

Fig. 4 is a section upon the line 4—4 of Fig. 1; and

Fig. 5 is a section upon the line 5—5 of Fig. 1.

In the drawings, 1 indicates a sleeve or tubular casing member which at one end thereof is closed by means of a base or shoe which is generally indicated at 2, and which is provided with an opening therethrough which is indicated at 3. The lower portion of this opening is enlarged as indicated at 4, for the purpose of receiving the head of a pin which will be later described. The member 2 comprises in the instant case a portion 5 which has a press fit within the end of the sleeve member 1 and is also provided with a foot or extension 6 which is made of sufficient length so that it may span adjacent projections or ribs which customarily form the outer portion of a pneumatic tire casing.

Within the tubular member 1 there is a plunger which is indicated at 7. This plunger is provided with indicating marks and proper indicia, one of which is indicated at 8 in Fig. 1, these markings 8 being so arranged that they will be in diagonal relation and the vertical distance between a given mark and a proximate diagonally placed mark will be one thirty-second of an inch.

The plunger 7 while fitting within the sleeve member 1 is of such relative dimensions that the plunger 7 may freely move within the sleeve member 1, but in order to prevent too free movement a resilient member is inserted in an annular slot 10 which is formed in the plunger member 7 adjacent the inner end thereof. This member 9 is biased outwardly so that it engages with the inner wall of the sleeve member and thus produces a yielding frictional engagement therewith which is sufficient to retain the plunger member 7 in any given position to which it may be moved.

The plunger member 7 at what may be described as its inner edge is provided with a recessed portion 11 which is adapted to receive the end portion of a pin 12. This pin when assembled with respect to the recess 11 has a press fit so that essentially the rod 12 becomes attached to the plunger 7.

The pin 12 extends through the opening 3 in the member 2 and at its lower end may be formed with a button-like head 13 which is of diameter greater than the diameter of the opening 3 in the member 2 so that the upward movement of the plunger 7 will be limited by the engagement of the head 13, with the surrounding wall portion of the opening 3 in the member 2 when the pin 12 will have been moved into a position such that the head 13 occupies the recess 4.

In assembling the pin 12 with respect to the plunger 7, the pin is pushed into the recess 11 until the engagement between the head 13 and the upper wall of the recess 4 is coincident with the registration of the zero line of the indicia lines upon plunger 7 with the outer end of the sleeve 1.

In the use of the device, the portion 6 is brought into engagement with the adjacent ribs upon the tire tread which is under examination, and the plunger member 7 positioned downwardly until the head of the pin will engage with the bottom surface of the groove or recess between the adjacent projections or ribs upon the tire. When this is done it is then possible to read in connection with the indicia on the member 7 the line or marking, such as the mark 8, which is nearest to align with the end of the sleeve member 1. This reading will indicate the depth, in thirty seconds of an inch, of the groove or recess between the projections or ribs upon the tire.

The depth of such groove or recess upon the tread of the tire is the same as the height of the ribs upon the tire casing tread so that it will be apparent how much of the tread remains and is available for further use.

As earlier stated in the specification, the gauge is intended as a handy instrument for use when required, and, therefore, in order that it may be conveniently carried in the pocket of the user a spring clip, generally indicated at 14, is provided which has a band portion 15 extending around a portion of the sleeve member 1 and in firm engagement with the sleeve member.

Obviously, modifications of the structure which has been described may be made within the

Having thus described my invention, I claim:

1. A tire tread-wear gauge comprising a sleeve member, a plunger member telescoped within said sleeve and normally extending beyond the upper end of the sleeve, said plunger having indicia lines upon its surface beginning with a zero line, said lines being adapted for coincidence with the upper end of the sleeve in different positions of the plunger with respect to the sleeve, a rod secured to an end of the plunger, said rod being provided with an extension at the lower end thereof, a base member adapted to be secured to the bottom end of said sleeve, said base member having a central passageway through which the lower portion of the said rod extends, said base member having a reentrant recess upon the bottom thereof which receives the said extension upon the rod when the zero line registers with the upper edge of the sleeve, said extension limiting movement of the sleeve and plunger in one direction, a friction member carried by the plunger and engaging with the inner surface of said sleeve to hold the plunger in adjusted position relative to the sleeve.

2. A tire tread-wear gauge comprising a sleeve member a plunger member telescoping within said sleeve and normally extending beyond the upper end of the sleeve, said plunger having indicia lines upon its surface there being a zero line and the said lines being adapted for register with the end of the sleeve in different positions of the plunger relative to the sleeve, a rod secured to an end of the plunger and provided with an extension, a plug member secured in the lower end of the sleeve, said plug member having a central passage through which the lower portion of the rod extends, the said rod being provided with an extension adjacent its end, the said extension being adapted to engage with the plug member to limit movement of the plunger in one direction and the said plug limiting the movement of the plunger in the other direction, the said plug having an extension and provided with a recess within which the extension on the rod is contained when the zero line registers with the edge of the upper end of the sleeve, a friction member carried by the plunger and engaging the inner surface of the sleeve to hold the plunger in adjusted position within the sleeve.

HENRY W. KROHN, Jr.

REFERENCES CITED

The following references are of record in the file of this patent:

UNITED STATES PATENTS

| Number | Name | Date |
|---|---|---|
| 1,110,879 | Brown | Sept. 15, 1914 |
| 1,248,340 | Kinney | Nov. 27, 1917 |
| 1,459,896 | John | June 26, 1923 |
| 1,601,407 | Murray | Sept. 28, 1926 |
| 1,737,726 | Muzyn | Dec. 3, 1929 |
| 1,998,420 | Carliss | Apr. 16, 1935 |
| 2,400,371 | Reeser | May 14, 1946 |
| 2,426,955 | Stroup | Sept. 2, 1947 |
| 2,550,508 | Wiedemer | Apr. 24, 1951 |

FOREIGN PATENTS

| Number | Country | Date |
|---|---|---|
| 74,645 | Switzerland | Mar. 16, 1917 |